US012671700B2

(12) United States Patent (10) Patent No.: US 12,671,700 B2
Tan (45) Date of Patent: Jun. 30, 2026

(54) METHOD FOR TRACING PATH OF ATTACK ON SMART CONTRACT ON BLOCKCHAIN

(71) Applicant: BEIJING LINGZONG SECURITY TECHNOLOGY CO., LTD, Beijing (CN)

(72) Inventor: Yuefei Tan, Beijing (CN)

(73) Assignee: BEIJING LINGZONG SECURITY TECHNOLOGY CO., LTD, Beijing (CN)

( * ) Notice: Subject to any disclaimer, the term of this patent is extended or adjusted under 35 U.S.C. 154(b) by 320 days.

(21) Appl. No.: 18/553,906

(22) PCT Filed: Jun. 20, 2023

(86) PCT No.: PCT/CN2023/101288
§ 371 (c)(1),
(2) Date: Oct. 4, 2023

(87) PCT Pub. No.: WO2024/001866
PCT Pub. Date: Jan. 4, 2024

(65) Prior Publication Data
US 2025/0080550 A1     Mar. 6, 2025

(30) Foreign Application Priority Data

Jun. 30, 2022    (CN) .......................... 202210770640.5

(51) Int. Cl.
*H04L 9/40*          (2022.01)
(52) U.S. Cl.
CPC ................................. *H04L 63/1416* (2013.01)

(58) Field of Classification Search
CPC .............................. H04L 63/1416; H04L 9/40
See application file for complete search history.

(56) References Cited

U.S. PATENT DOCUMENTS

2016/0342978 A1* 11/2016 Davis ................. G06Q 20/4016
2018/0191503 A1* 7/2018 Alwar ................... H04L 9/3242
(Continued)

OTHER PUBLICATIONS

T. Chen et al., "DataEther: Data Exploration Framework for Ethereum," 2019 IEEE 39th International Conference on Distributed Computing Systems (ICDCS), Dallas, TX, USA, 2019, pp. 1369-1380, doi: 10.1109/ICDCS.2019.00137. (Year: 2019).*
(Continued)

*Primary Examiner* — Daniel B Potratz
*Assistant Examiner* — Matthias Habtegeorgis
(74) *Attorney, Agent, or Firm* — Carter, DeLuca & Farrell, LLP

(57) ABSTRACT

The present disclosure provides a method for tracing a path of an attack on a smart contract on a blockchain, belonging to the technical field of blockchains. The method specifically includes: determining a hacker's attack address, and determining an attack's start time and an attack's stop time according to a data record of the hacker's attack address; and determining hash values of all transactions from a hacker's attack destination address between the attack's start time and the attack's stop time automatically, and obtaining a fungible token and a non-fungible token by parsing the hash values automatically. The problems of large error and low efficiency during original manual extraction are solved, accuracy and efficiency are higher, and the overall security is improved.

14 Claims, 2 Drawing Sheets

Determine a hacker's attack address, and determine an attack start time and an attack stop time according to a data record of the hacker's attack address Determine hash values of all transactions from a hacker's attack destination address between the attack start time and the attack stop time automatically, and obtain a fungible token and a non-fungible token by parsing the hash values automatically

(56) References Cited

U.S. PATENT DOCUMENTS

| | | | |
|---|---|---|---|
| 2019/0311357 A1* | 10/2019 | Madisetti | G06Q 20/381 |
| 2020/0162485 A1* | 5/2020 | Jevans | H04L 63/0428 |
| 2022/0101316 A1* | 3/2022 | Cramer | G06Q 20/3825 |
| 2022/0101326 A1* | 3/2022 | Kim | G06Q 20/4016 |

OTHER PUBLICATIONS

Mizrach, Bruce. "Stablecoins: Survivorship, transactions costs and exchange microstructure." arXiv preprint arXiv:2201.01392 (2022). (Year: 2022).*

* cited by examiner

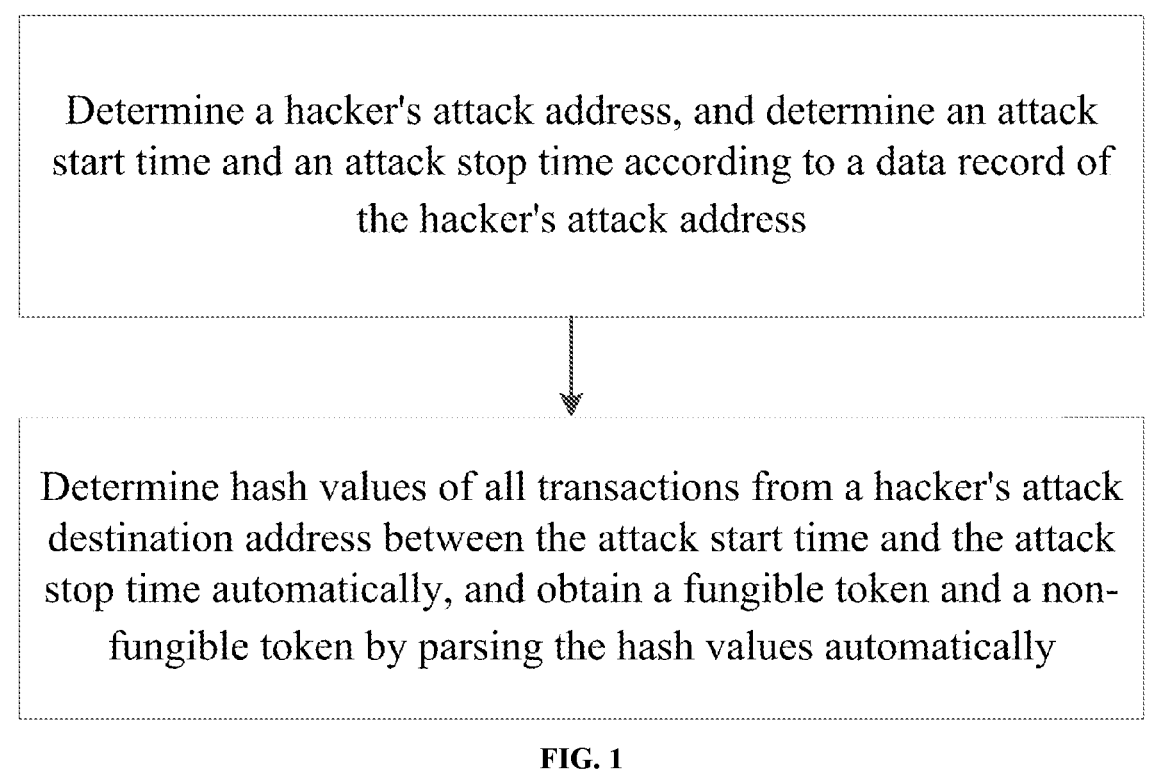

Determine a hacker's attack address, and determine an attack start time and an attack stop time according to a data record of the hacker's attack address Determine hash values of all transactions from a hacker's attack destination address between the attack start time and the attack stop time automatically, and obtain a fungible token and a non-fungible token by parsing the hash values automatically

FIG. 1

Query hash values of all transactions from a hacker's attack
address between an attack start time and an attack stop time Obtain a hacker's attack destination address by parsing the hash
values of the transactions from the hacker's attack address, and
record all transaction records of the hacker's attack destination
address Read all the transaction records of the hacker's attack destination
address and a hacker's attack destination address value
corresponding to the hacker's attack destination address, and
query and store the hash values of all the transactions initiated
by the hacker's attack address and taking the hacker's attack
destination address as an attack target between the attack start
time and the attack stop time

FIG. 2

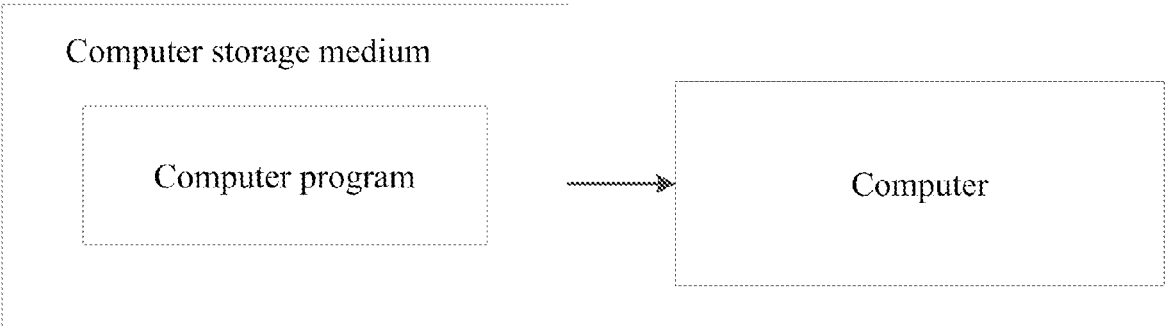

FIG. 3

METHOD FOR TRACING PATH OF ATTACK ON SMART CONTRACT ON BLOCKCHAIN

CROSS REFERENCE TO RELATED APPLICATION

The present application is a national stage application of International Patent Application No. PCT/CN2023/101288, filed on Jun. 20, 2023, which claims priority to the Chinese Patent Application No. 2022107706405, filed with the China National Intellectual Property Administration on Jun. 30, 2022, and entitled "METHOD FOR TRACING PATH OF ATTACK ON SMART CONTRACT ON BLOCKCHAIN", the entire contents of each of which is incorporated herein by reference.

TECHNICAL FIELD

The present disclosure belongs to the technical field of blockchains, and particularly relates to a method for tracing a path of an attack on a smart contract on a blockchain.

BACKGROUND

As a hot technology, a blockchain can empower industries of healthcare, logistics, e-commerce, finance, education, etc. with its features of being tamper-proof, forge-proof, repudiation-proof, traceable, independent of trusted third-party institutions, and supportive of smart contracts. However, as the underlying technology for various decentralized applications (DApps), the security of blockchain itself will fundamentally determine the security, availability, and performance of the upper decentralized applications. A blockchain is deployed on the Internet where various network threats are found, especially decentralized applications on the blockchain involving a large number of assets, making the blockchain an important target for hackers. There has been a proliferation of blockchain security incidents in recent years, from an underlying Peer to Peer (P2P) network to a middle virtual machine to an upper smart contract, all of which have become the targets of hackers.

Currently, in the public blockchain space, the most frequent security incidents are hacker attacks on a smart contract deployed on public blockchains. In all public blockchains, attacks on Ethereum Virtual Machine (EVM)-compatible blockchains occur most frequently. When a hacker launches an attack on a smart contract deployed on these blockchains, the hacker's transactions and attack process can be traced on a publicly accessible blockchain browser, which is currently available only through manual queries. Owing to the complex setting of blockchain technology itself, the reliance on manual queries is not only far from efficient, but also poor in query accuracy, causing serious mistakes.

In view of the above technical problems, the present disclosure provides a method for tracing a path of an attack on a smart contract on a blockchain.

SUMMARY

In order to achieve the objective of the present disclosure, the present disclosure uses the following technical solutions.

An aspect of the present disclosure provides a method for tracing a path of an attack on a smart contract on a blockchain.

The method for tracing a path of an attack on a smart contract on a blockchain specifically includes:

S1: determining a hacker's attack address, and determining an attack's start time and an attack's stop time according to a data record of the hacker's attack address; and S2: determining hash values of all transactions from a hacker's attack destination address between the attack's start time and the attack's stop time automatically, and obtaining a fungible token and a non-fungible token by parsing the hash values automatically.

Firstly, the hacker's attack address is determined, the data record of the hacker's attack address is parsed, and the attack's start time and the attack's stop time of the hacker's attack address may be obtained. All hash values for the hacker's attack destination address between the stop time and the start time are obtained automatically. The final fungible token and the non-fungible token may be obtained by parsing the hash values, so as to solve the existing problems of poor efficiency, easy omission of results and low accuracy caused by merely relying on a manual query, and further to solve potential safety hazards fundamentally.

The hash values of all the transactions from the hacker's attack destination address on the blockchain are determined automatically by means of automatic obtaining. Transaction transfer records of the tokens, the fungible token and the non-fungible token are obtained by parsing the hash values automatically. Thus, various problems of an original manual query are solved. A path of a hacker's attack is traced automatically. A content of the hacker's attack is parsed according to an automatic tracing result. On the basis of achieving automatic tracing, the overall tracing result becomes more valuable by parsing the result, so as to solve the potential safety hazards fundamentally.

In a further technical solution, the hash values of all the transactions from the hacker's attack destination address are queried according to the following steps:

S21, querying hash values of all transactions from the hacker's attack address between the attack's start time and the attack's stop time;

S22, obtaining the hacker's attack destination address by parsing the hash values of the transactions from the hacker's attack address, and recording all transaction records of the hacker's attack destination address; and S23, reading all the transaction records of the hacker's attack destination address and the hacker's attack destination address value corresponding to the hacker's attack destination address, and querying and storing the hash values of all the transactions initiated by the hacker's attack address and taking the hacker's attack destination address as an attack target between the attack's start time and the attack's stop time.

Firstly, transaction addresses of all transactions from the hacker's address are obtained by reading the hash values of the transactions, such that all the transactions from the hacker's address can be completely stored. Based on the described result, the transaction addresses are screened to obtain all transactions with the hacker's attack destination address as a target. The hash values of all the described transactions are stored and queried to automatically trace a path of an attack on a smart contract, and solve various problems during manual reading.

In a further technical solution, the hash values of all the transactions from the hacker's attack address between the attack's start time and the attack's stop time are queried through a Web3 Application Programming Interface (API).

All the hacker's attack addresses can be queried accurately and automatically by querying data through the specific interface, so as to greatly improve the overall efficiency.

In a further technical solution, the hacker's attack address is determined by reading a character string beginning with a symbol "0x" on the blockchain.

Determination efficiency of the hacker's attack address is greatly improved by positioning a character string stored in the hacker's attack address.

In a further technical solution, the hacker's attack destination address is determined according to a transaction address label value of the hacker's attack destination address.

In a further technical solution, the hash values are parsed automatically to obtain an event "Internal Transactions" and an event "Tokens Transferred".

The hash values are parsed from two aspects, such that a tracing result of the hacker's attack address becomes more perfect. Further, a final result becomes more valuable, so as to solve an original security risk fundamentally.

In a further technical solution, the event "Internal Transactions" is parsed by querying at least one of a keyword "Transfer", a keyword "send" and a keyword "call", to obtain a transferred-out token.

By positioning the keyword of the transferred-out token, the token can be traced only by parsing some keywords, so as to greatly improve the security and convenience.

In a further technical solution, the event "Tokens Transferred" is parsed by querying at least one of a keyword "Transfer", a keyword "send" and a keyword "call", to obtain a transferred-out fungible token and a transferred-out non-fungible token.

By positioning the keywords of the transferred-out fungible token and the transferred non-fungible token, the fungible token and the non-fungible token can be traced only by parsing some keywords, so as to greatly improve the security and convenience.

The fungible token is an ERC-20 token, and the non-fungible token is an ERC-721 token or an ERC-1155 token.

In another aspect, an embodiment of the present application provides a computer-readable storage medium, storing a computer program. When the computer program is executed in a computer, the computer executes the above method for tracing a path of an attack on a smart contract on a blockchain.

In yet another aspect, an embodiment of the present application provides a computer program product, storing an instruction. When the instruction is executed by a computer, the computer implements the above method for tracing a path of an attack on a smart contract on a blockchain.

BRIEF DESCRIPTION OF THE DRAWINGS

FIG. 1 is a flowchart of a method for tracing a path of an attack on a smart contract on a blockchain in Embodiment 1;

FIG. 2 is a flowchart of a querying process for hash values of all transactions from a hacker's attack destination address in Embodiment 1; and FIG. 3 is a structural diagram of a computer-readable storage medium in Embodiment 2.

DETAILED DESCRIPTION OF THE EMBODIMENTS

The illustrative implementations are described more comprehensively below with reference to the accompanying drawings. However, the illustrative implementations can be implemented in various forms, and should not be construed as being limited to those described herein. On the contrary, these implementations are provided to make the present disclosure comprehensive and complete and to fully convey the concept manifested therein to those skilled in the art. The same reference numerals in the figures indicate the same or similar structures, and thus their detailed descriptions are omitted.

The terms "a", "an" and "the" are used to indicate that there are one or more elements/components/etc. The terms "comprise" and "have" are used to mean open-ended inclusion and mean that there may be additional elements/components/etc. besides the listed elements/components/etc.

As a hot technology, a blockchain can empower industries of healthcare, logistics, e-commerce, finance, education, etc. with its features of being tamper-proof, forge-proof, repudiation-proof, traceable, independent of trusted third-party institutions, and supportive of smart contracts. However, as the underlying technology for various decentralized applications (DApp), the security of the blockchain itself will fundamentally determine the security, availability, and performance of the upper decentralized applications. The blockchain is deployed on the Internet where various network threats are found, especially decentralized applications on the blockchain involving a large amount of money, making the blockchain an important target for hackers. There has been a proliferation of blockchain security incidents in recent years, from an underlying Peer to Peer (P2P) network to a middle virtual machine to an upper smart contract, all of which have become the targets of hackers.

Currently, in the public blockchain space, the most frequent security incidents are hacker attacks on a smart contract deployed on public blockchains. In all public blockchains, attacks on Ethereum Virtual Machine (EVM)-compatible blockchains occur most frequently. When a hacker launches an attack on a smart contract deployed on these blockchains, the hacker's transactions and attack process can be traced on a publicly accessible blockchain browser, which is currently available only through manual queries. Owing to the complex setting of blockchain technology itself, the reliance on manual queries is not only far from efficient, but also poor in query accuracy.

Embodiment 1

As shown in FIG. 1, an aspect of the present disclosure provides a method for tracing a path of an attack on a smart contract on a blockchain, specifically including:

S1: determine a hacker's attack address, and determine an attack's start time and an attack's stop time according to a data record of the hacker's attack address; and S2: determine hash values of all transactions from a hacker's attack destination address between the attack's start time and the attack's stop time automatically, and obtain transaction transfer records of tokens, a fungible token and a non-fungible token by parsing the hash values automatically.

Firstly, the hacker's attack address is determined, the data record of the hacker's attack address is parsed, and the attack's start time and the attack's stop time of the hacker's attack address may be obtained. All hash values for the hacker's attack destination address between the stop time and the start time are obtained automatically. The final transaction transfer records of tokens, the fungible token and the non-fungible token may be obtained by parsing the hash values, so as to solve the existing problems of poor efficiency, easy omission of results and low accuracy caused by merely relying on a manual query.

The hash values of all the transactions from the hacker's attack destination address in the blockchain are determined automatically by means of automatic obtaining. Transaction transfer records of the tokens, the fungible token and the non-fungible token are obtained by parsing the hash values automatically. Thus, various problems of an original manual query are solved. A path of a hacker's attack is traced automatically. A content of the hacker's attack is parsed according to an automatic tracing result. On the basis of achieving automatic tracing, the overall tracing result becomes more valuable by parsing the result.

In a further technical solution, as shown in FIG. 2, the hash values of all the transactions from the hacker's attack destination address are queried according to the following steps:

S21, query hash values of all transactions from the hacker's attack address between the attack's start time and the attack's stop time;

S22, obtain a hacker's attack destination address by parsing the hash values of the transactions from the hacker's attack address, and record all transaction records of the hacker's attack destination address; and S23, read all the transaction records of the hacker's attack destination address and a hacker's attack destination address value corresponding to the hacker's attack destination address, and query and store the hash values of all the transactions initiated by the hacker's attack address and taking the hacker's attack destination address as an attack target between the attack's start time and the attack's stop time.

Firstly, transaction addresses of all transactions from the hacker's address are obtained by reading the hash values of the transactions, such that all the transactions from the hacker's address can be completely stored. Based on the described result, the transaction addresses are screened to obtain all transactions with the hacker's attack destination address as a target. The hash values of all the described transactions are stored and queried to automatically tracing a path of an attack on a smart contract, and solve various problems during manual reading.

For a hash value of each transaction, an initiator address "From" of the transaction and the hacker's attack destination address "To" of the transaction can be queried publicly from a blockchain browser.

For example, when the hacker's attack destination address is "Contract Creation", all transactions from the hacker's attack destination address "Contract Creation" can be obtained by determining the hash value of each transaction, and the hacker's attack destination addresses of all the transactions mentioned above are returned, such that the hash values of all the transactions from all hacker's attack destination addresses are queried by parsing all the hash values of the hacker's attack destination address "Contract Creation" from all the hacker's addresses.

In a further technical solution, the hash values of all the transactions from the hacker's attack address between the attack's start time and the attack's stop time are queried through a Web3 Application Programming Interface (API).

All the hacker's attack addresses can be queried accurately and automatically by querying data through the specific interface, so as to greatly improve the overall efficiency.

In a further technical solution, the hacker's attack address is determined by reading a character string beginning with a symbol "0x" on the blockchain.

Determination efficiency of the hacker's attack address is greatly improved by positioning a character string stored in the hacker's attack address.

In a further technical solution, the hacker's attack destination address is determined according to a transaction address label value of the hacker's attack destination address.

In a further technical solution, the hash values are parsed automatically to obtain an event "Internal Transactions" and an event "Tokens Transferred".

The hash values are parsed from two aspects, such that a tracing result of the hacker's attack address becomes more perfect. Further, a final result becomes more valuable, so as to solve an original security risk fundamentally.

In a further technical solution, the event "Internal Transactions" is parsed by querying at least one of a keyword "Transfer", a keyword "send" and a keyword "call", to obtain a transferred-out token.

By positioning the keyword of the transferred-out token, the token can be traced only by parsing some keywords, so as to greatly improve the security and convenience.

In a further technical solution, the event "Tokens Transferred" is parsed by querying at least one of a keyword "Transfer", a keyword "send" and a keyword "call", to obtain a transferred-out fungible token and a transferred-out non-fungible token.

By positioning the keywords of the transferred-out fungible token and the transferred non-fungible token, the fungible token and the non-fungible token can be traced only by parsing some keywords, so as to greatly improve the security and convenience.

The fungible token is an ERC-20 token, and the non-fungible token is an ERC-721 token or an ERC-1155 token. The ERC-20 token is based on a Fungible Token standard universal in the Ethernet blockchain and an Ethereum Virtual Machine (EVM)-compatible blockchain. The ERC-721 and the ERC-1155 are non-Fungible Token standards universal in the Ethernet blockchain and the EVM-compatible blockchain.

Embodiment 2

As shown in FIG. 3, in another aspect, an embodiment of the present application provides a computer-readable storage medium, storing a computer program. When the computer program is executed in a computer, the computer executes the above method for tracing a path of an attack on a smart contract on a blockchain.

Embodiment 3

In yet another aspect, an embodiment of the present application provides a computer program product, storing an instruction. When the instruction is executed by a computer, the computer implements the above method for tracing a path of an attack on a smart contract on a blockchain.

In the embodiments of the present disclosure, the term "a plurality of" means two or more, unless otherwise specifically defined. The terms "mount", "connect", "fix", etc. should be understood in a broad sense. For example, "connect" may be a fixed connection, a detachable connection or an integrated connection. Those of ordinary skill in the art may understand specific meanings of the above terms in the embodiments of the present disclosure based on a specific situation.

It should be understood that in the description of the embodiments of the present disclosure, the terms "up", "down", etc. indicate the orientation or position relationships based on the accompanying drawings. These terms are merely intended to facilitate description of the embodiments of the present disclosure and simplify the description, rather than to indicate or imply that the mentioned device or unit must have a specific direction and must be constructed and operated in a specific orientation. Therefore, these terms should not be construed as a limitation to the embodiments of the present disclosure.

In the description of this specification, the description of the terms "an embodiment", "a preferred embodiment", etc. means that the specific features, structures, materials, or characteristics described with reference to the embodiment or example are included in at least one embodiment or example of the embodiments of the present disclosure. In this specification, the schematic descriptions of the above terms do not necessarily refer to the same embodiment or example. Moreover, the specific features, structures, materials, or characteristics described may be combined in any suitable way in any one or more embodiments or examples.

What are described above are merely preferred embodiments of the embodiments of the present disclosure, and are not intended to limit the embodiments of the present disclosure. Various changes and modifications may be made to the embodiments of the present disclosure by those skilled in the art. Any modifications, equivalent substitutions, improvements, etc. made within the spirit and scope of the embodiments of the present disclosure should be included within the protection scope of the embodiment of the present disclosure.

What is claimed is:

1. A method for tracing a path of an attack on a smart contract on a blockchain, the method comprising:

S1: determining a hacker's attack address, and determining an attack's start time and an attack's stop time according to a data record of the hacker's attack address; and S2: determining hash values of all transactions from a hacker's attack destination address between the attack's start time and the attack's stop time automatically, and obtaining a fungible token and a non-fungible token by parsing the hash values automatically, wherein the hash values of all the transactions from the hacker's attack destination address are queried according to the following steps:

S21, querying hash values of all transactions from the hacker's attack address between the attack's start time and the attack's stop time;

S22, obtaining the hacker's attack destination address by parsing the hash values of the transactions from the hacker's attack address, and recording all transaction records of the hacker's attack destination address; and S23, reading all the transaction records of the hacker's attack destination address and the hacker's attack destination address value corresponding to the hacker's attack destination address, and querying and storing the hash values of all the transactions initiated by the hacker's attack address and taking the hacker's attack destination address as an attack target between the attack's start time and the attack's stop time.

2. The method for tracing a path of an attack on a smart contract on a blockchain according to claim 1, wherein the hash values of all the transactions from the hacker's attack address between the attack's start time and the attack's stop time are queried through a Web3 Application Programming Interface (API).

3. The method for tracing a path of an attack on a smart contract on a blockchain according to claim 1, wherein the hacker's attack address is determined by reading a character string beginning with a symbol "0x" on the blockchain.

4. The method for tracing a path of an attack on a smart contract on a blockchain according to claim 1, wherein the hacker's attack destination address is determined according to a transaction address label value of the hacker's attack destination address.

5. The method for tracing a path of an attack on a smart contract on a blockchain according to claim 1, wherein the hash values are parsed automatically to obtain an event "Internal Transactions" and an event "Tokens Transferred".

6. The method for tracing a path of an attack on a smart contract on a blockchain according to claim 5, wherein the event "Internal Transactions" is parsed by querying at least one of a keyword "Transfer", a keyword "send" and a keyword "call", to obtain a transferred-out token.

7. The method for tracing a path of an attack on a smart contract on a blockchain according to claim 5, wherein the event "Tokens Transferred" is parsed by querying at least one of a keyword "Transfer", a keyword "send" and a keyword "call", to obtain a transferred-out fungible token and a transferred-out non-fungible token.

8. A non-transitory computer-readable storage medium, storing a computer program, wherein when the computer program is executed in a computer, the computer executes the method for tracing a path of an attack on a smart contract on a blockchain according to claim 1.

9. The non-transitory computer-readable storage medium according to claim 8, wherein the hash values of all the transactions from the hacker's attack address between the attack's start time and the attack's stop time are queried through a Web3 Application Programming Interface (API).

10. The non-transitory computer-readable storage medium according to claim 8, wherein the hacker's attack address is determined by reading a character string beginning with a symbol "0x" on the blockchain.

11. The non-transitory computer-readable storage medium according to claim 8, wherein the hacker's attack destination address is determined according to a transaction address label value of the hacker's attack destination address.

12. The non-transitory computer-readable storage medium according to claim 8, wherein the hash values are parsed automatically to obtain an event "Internal Transactions" and an event "Tokens Transferred".

13. The non-transitory computer-readable storage medium according to claim 12, wherein the event "Internal Transactions" is parsed by querying at least one of a keyword "Transfer", a keyword "send" and a keyword "call", to obtain a transferred-out token.

14. The non-transitory computer-readable storage medium according to claim 12, wherein the event "Tokens Transferred" is parsed by querying at least one of a keyword "Transfer", a keyword "send" and a keyword "call", to obtain a transferred-out fungible token and a transferred-out non-fungible token.

* * * * *